(12) United States Patent
Van Wert

(10) Patent No.: US 11,206,806 B2
(45) Date of Patent: Dec. 28, 2021

(54) MODULAR PET LITTER BOX SYSTEM

(71) Applicant: Creative PetWorks LLC, Eden Prairie, MN (US)

(72) Inventor: Carrie Van Wert, Eden Prairie, MN (US)

(73) Assignee: Creative PetWorks LLC, Eden Prairie, MN (US)

( * ) Notice: Subject to any disclaimer, the term of this patent is extended or adjusted under 35 U.S.C. 154(b) by 176 days.

(21) Appl. No.: 16/705,086

(22) Filed: Dec. 5, 2019

(65) Prior Publication Data

US 2020/0187450 A1    Jun. 18, 2020

Related U.S. Application Data

(60) Provisional application No. 62/821,690, filed on Mar. 21, 2019, provisional application No. 62/775,421, filed on Dec. 5, 2018.

(51) Int. Cl.
*A01K 1/01* (2006.01)

(52) U.S. Cl.
CPC ............ *A01K 1/011* (2013.01); *A01K 1/0114* (2013.01); *A01K 1/0125* (2013.01)

(58) Field of Classification Search
CPC .. A01K 1/0114; A01K 1/0107; A01K 1/0125; A01K 1/011; A01K 23/005; A01K 31/04
USPC ................................ 119/166, 165, 168, 161
See application file for complete search history.

(56) References Cited

U.S. PATENT DOCUMENTS

| | | | |
|---|---|---|---|
| 5,080,044 A * | 1/1992 | Bosworth | A01K 1/0125 119/168 |
| 5,325,815 A | 7/1994 | Gumpesberger | |
| 5,353,743 A | 10/1994 | Walton | |
| 5,517,947 A | 5/1996 | Christman | |
| 5,797,346 A | 8/1998 | Lewis | |
| 5,799,610 A | 9/1998 | Poulos | |
| 5,913,282 A * | 6/1999 | Indes | A01K 1/0125 119/168 |
| 6,837,179 B2 * | 1/2005 | Sannikka | A01K 23/005 119/165 |
| 6,941,894 B2 | 9/2005 | D'Anielo | |
| 8,235,006 B2 | 8/2012 | Lipscomb et al. | |
| D782,756 S | 3/2017 | Veness et al. | |
| 10,111,403 B2 * | 10/2018 | Sareyani | A01K 1/0125 |
| 10,159,215 B2 | 12/2018 | Petty et al. | |
| D839,498 S | 1/2019 | Petty et al. | |

(Continued)

OTHER PUBLICATIONS

International Search Report and Written Opinion for PCT/US209/64783 dated May 6, 2020 14 pages.

*Primary Examiner* — Yvonne R Abbott-Lewis
(74) *Attorney, Agent, or Firm* — Christensen, Fonder, Dardi & Herbert PLLC

(57) ABSTRACT

A pet litter box system comprising a base tray with a non-apertured bottom wall and a plurality of sifting trays each with an apertured bottom wall, the sifting trays formed of molded pulp material. The sifting trays and base nest together. The system may include an upper shield seated on the nested sifting trays to contain litter that is kicked up by a cat utilizing the tray system. The shield may be formed of pulp and inverted to receive nested pulp sifting trays to define a transport or storage mode, the shield enhancing the combined structure in the transport or storage mode.

20 Claims, 11 Drawing Sheets

(56) References Cited

U.S. PATENT DOCUMENTS

| | | |
|---|---|---|
| 2009/0000560 A1 | 1/2009 | Matsuo et al. |
| 2010/0095899 A1* | 4/2010 | Lipscomb ............ A01K 1/0114 |
| | | 119/167 |
| 2012/0235159 A1 | 12/2012 | Penner |
| 2012/0325159 A1 | 12/2012 | Penner |
| 2014/0150727 A1 | 6/2014 | Matsuo et al. |
| 2015/0353232 A1* | 12/2015 | Kandel ............. B65D 21/0204 |
| | | 220/574 |
| 2016/0219828 A1 | 8/2016 | Goerz |
| 2016/0345545 A1* | 12/2016 | Huisinga .............. A01K 31/005 |
| 2017/0118946 A1 | 5/2017 | Sareyani |
| 2018/0110199 A1* | 4/2018 | Venezio ............... A01K 1/0125 |
| 2019/0357494 A1* | 11/2019 | Garrett .................. B65D 5/321 |
| 2020/0367465 A1* | 11/2020 | Yamamoto ............ A61F 13/513 |
| 2021/0051916 A1* | 2/2021 | Weber .................. A01K 1/0107 |
| 2021/0243993 A1* | 8/2021 | Coren ............... B65D 21/0233 |

* cited by examiner

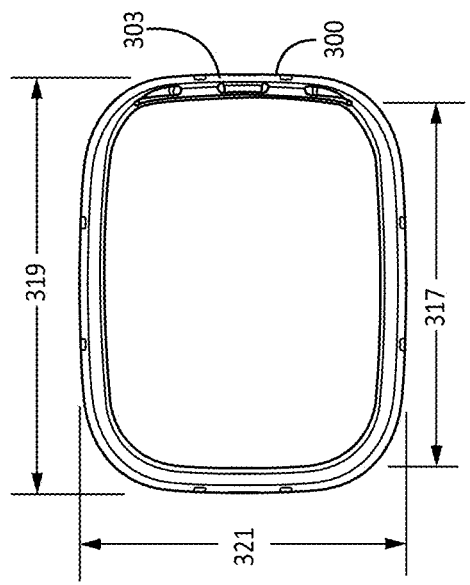 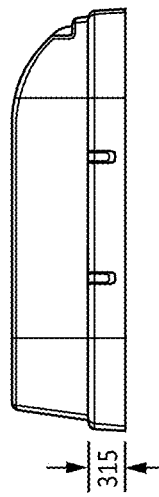 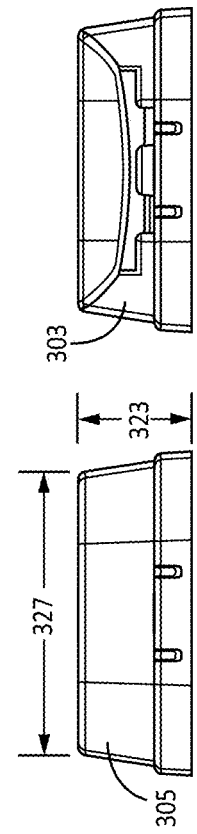 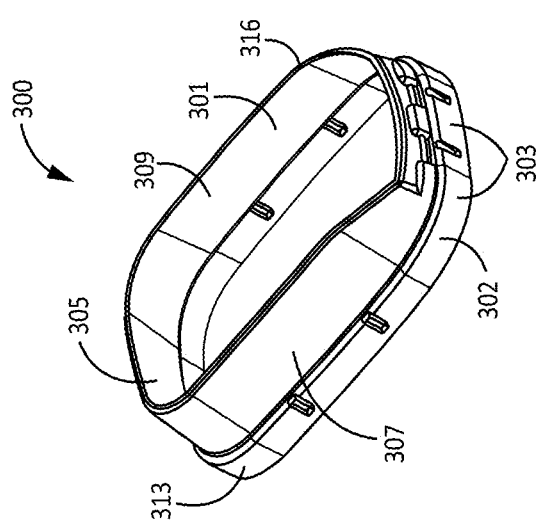 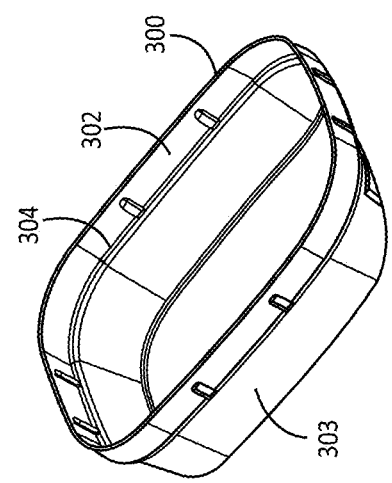
FIG. 3C  FIG. 3D  FIG. 3E  FIG. 3F  FIG. 3A  FIG. 3B

MODULAR PET LITTER BOX SYSTEM

CROSS-REFERENCE TO RELATED APPLICATION

This application claims the benefits of U.S. Provisional Application No. 62/775,421 filed on Dec. 5, 2018 and of U.S. Provisional Application No. 62/821,960 filed on Mar. 21, 2019, the disclosures of which are incorporated by reference herein in their entirety.

FIELD OF THE DISCLOSURE

This invention relates to a pet waste system. More specifically, this invention relates to a environmentally friendly and pet friendly pet litter box system.

BACKGROUND

Litter boxes and litter box systems are used by pet owners to provide a sanitary location for pets to relieve themselves, particularly cats. Litter boxes are typically a single tray with a generally rectangular shape with upwardly and four outwardly canted sidewall portions formed from plastic, the sidewalls of uniform height. Such trays are filled with a granular material, litter, which may absorb moisture and unpleasant odors. Litter may also allow a pet to indulge a natural instinct to bury excrement. However, the act of burying the excrement, typically done by flicking litter backwards with their paws, can cause litter to be sprayed over the sidewalls leaving soiled litter spread across a room.

Excrement is desirably routinely purged from the litter box. This is typically an unsanitary and unpleasant process requiring scooping the excrement from the litter box. Alternatively, the litter can be dumped and replaced in its entirety, which is wasteful when the litter is not fully saturated clumped. Before the litter is replaced, the plastic litter box should be washed of excrement and residue and preferably sanitized.

Such conventional plastic litter boxes are structurally very durable and may last a very long time. As such, they may become a breeding ground for bacteria if not cleaned properly with mild detergent and may lead to health and behavioral problems for a cat. Some cleaning products are toxic to cats. Misuse of the litter box is the leading reason cats are abused, surrendered or euthanized. The Animal Humane Society of the United States and many other leading veterinary medical authorities recommend that the litter box be thoroughly cleaned each time the litter is replaced—which for clumping litter it may be extended to 3-4 weeks and for non-clumping litter weekly. The ASPCA (American Society for the Prevention of Cruelty to Animals) recommends the litter box be properly cleaned weekly. This chore is unpleasant, inconvenient and may not occur, leading to the risk of the aforementioned health and behavioral issues.

The surface of plastic litter trays can become scratched and impossible to properly clean and over time become embedded with bacteria. Then, when a cat digs, the bacteria are flung into the air where they can breathe it in. When a user cleans the litter box, they are also at risk of inhaling the bacteria. To prevent scratched plastic trays from becoming contaminated with unhealthy bacteria it is recommended that a plastic litter box be replaced at least once per year.

Replacing scratched litter boxes leads to millions of pounds of plastic ending up in landfills that will not degrade for hundreds of years.

Another problem that comes from scratched plastic litter boxes is foul odors. Waste matter can become trapped in even the smallest of scratches. The plastic then absorbs the odor, and it becomes impossible to eliminate, thus creating a problem for the cat and household. Ammonia is toxic to both humans and cats alike. Cat's sense of smell is far greater than humans and may reject a foul smelling litter box causing them to eliminate waste outside the box resulting in the aforementioned health and behavioral problems.

Even replacing plastic litter boxes once per year as recommended do not generate meaningful repeat sales at retail pet stores. Often plastic trays that are used for litter boxes may not even be sold as litter boxes, rather being sold as multipurpose plastic trays in grocery stores, hardware stores, or the like.

In addition to the simple plastic tray litter boxes, there are litter box systems that include, for example, stacked sifting trays, these systems are also conventionally formed of plastic and generally have matrixically arranged holes and slots. Litter box systems including systems with sifting trays are disclosed in U.S. patents and Publication Nos. U.S. Pat. Nos. 5,325,815, 5,353,743, 5,799,610, 6,941,894, D782,756, D839,498, 8,235,006, 10,111,403, 10,159,215, 2012/0325159 and 2019/0216042, all of which are incorporated herein by reference for all purposes.

Typically, the holes of a top tray are blocked by structure of the like tray therebelow. With the litter in the top tray of the stack, the top tray can be raised above the adjacent tray therebelow allowing the unused litter to be sifted to the tray below, keeping the clumped litter and pet excrement that is too large to fall through the holes in the top tray. Such remaining clumped litter and pet excrement in the removed top tray can then be disposed.

Any improvements in litter box maintenance systems including sifting trays that provide enhanced ease of use and cleanliness to the pet owner would be well received by the pet loving public. Any litter box system that would provide increased or reoccurring sales to pet stores would be well received by the pet supply industry.

SUMMARY

The inventor has recognized and identified deficiencies with respect to conventional pet litter boxes and litter box systems and have resolved such deficiencies with a pulp based sifting tray litter box system that provides features and advantages not available in conventional systems.

Conventional litter box trays are formed of plastic. The polymers of such trays, for example polyethylenes, are for all practical purposes, impervious both to air and moisture. The surface of such polymer trays can be damaged by pet claws scratching same when the pet, particularly cats, try to cover the cat's excrement. Such scratching can damage the surface of the trays and cause shedding of plastic particles containing toxic compounds such as Bisphenol-A (BPA). The scratches on the tray can be a site for bacteria growth as well as excrement and litter particle retention. Such scratches can make the tray more difficult to clean and requiring more frequent cleaning for maintaining proper cleanliness. Moreover, some veterinarians recommend replacing plastic trays at least once per year. However, simply throwing out and replacing plastic litter trays is not environmentally desirable.

Moreover, the impervious nature of plastic in plastic trays inhibits drying of excrement in the litter box. The delay in drying of excrement in the litter box is believed to contribute to bacterial growth in and on the plastic tray and clearly exacerbates odor issues. The longer the excrement has elevated moisture content, the longer odors linger. Ammonia can be a toxic byproduct of cat excrement where drying has been inhibited.

With respect to litter box systems that utilize sifting trays, such trays are also conventionally formed of plastic and the matrixical arrangement of holes and the structure to block the holes create a complex bottom wall of such shifting trays. Such complexity requires expensive injection molding molds for manufacturing such trays and such is reflected in the price to consumers. Additionally, such structural complexity is difficult to clean and sanitize. For example the clumped litter and excrement may get trapped in the holes and complex structure. Moreover, interior of holes, particularly when the complex structure is configured as a grating cannot be easily contacted with cleaning tools. Complete cleaning can be tedious or nearly impossible. Although such trays can typically be adequately cleaned in automatic dishwashers, most pet owners are not inclined to put their litter box into their kitchen dishwashers or to try to clean them in their kitchen sinks. Additionally, the complicated plastic structure can catch cat claws when the cat tries to their cover excrement by flicking their paws potentially causing the cat to spray the cat litter more erratically that a smooth based litter box tray, exacerbating the problem of litter being sprayed out of the litter box system. Such conventional plastic sifting trays systems have these and other deficiencies with respect to maintaining cleanliness of the system and providing ease of use to users.

Humane societies report that a major reason cats end up at their facilities is litter box issues. They reject the litter box. The inventor believes that this is caused in part by the odors associated with the litter box from the plastic materials therein and cleanliness issues, for example odors associated with bacteria growth.

Cats are sensitive to smell and touch and prefer natural materials over plastic. Surfaces that offer textures to mimic those naturally occurring, like cardboard which is derived from wood pulp or wheat straw and grasses are more pleasing to cats and thereby would help to attract a cat to eliminate properly into a container made from these materials.

A modular pet litter box system in accordance with embodiments addresses the above issues and deficiencies and includes, in a use configuration, a base tray with a closed bottom wall and unitary sidewalls with an upper lip portion, at least two pulp formed sifting trays nested within the base tray, each sifting tray having a bottom wall with sifting structure and sidewalls with upper lip portions, the sifting trays nest within the base tray, and a high shield with a lower shoulder and skirt portion and upwardly extending walls, the high shield seated on the upper lip portion of an uppermost of the at least two sifting trays at the lower shoulder and skirt portion of the high shield.

The inventor has determined that cat sifting litter systems formed from pulp material, is an attractant to cats, compared to plastic cat litter systems. This believed to be due, particularly with respect to the odors emanating therefrom. Bacterial growth is minimized or effectively eliminated in such systems, preventing odors caused by such bacteria. It is believed that pulp material, particularly when formed from recycled cardboard, grasses, bagasse, bamboo, and other organic material are particularly suitable as attractants to cats when associated with cat litter box systems.

The base tray and each sifting tray have unitary sidewall portions extending upwardly from the bottom wall and being canted outwardly and conformingly sized for nesting. Each sifting tray sidewall portion having at the upper lip, in cross section, an inverted J or a hook shape such providing a downwardly facing peripheral recess that receives the upper lip of a like configured sifting tray or the base tray therebelow. In embodiments, the high shield having four sidewall portions that converge inwardly in an upward direction and define a closed loop. A forward wall is shorter than a rearward wall providing a pet access region at the forward wall. A unitary shoulder portion extends outwardly from the lower margin of the four sidewall portions and then a skirt portion extends downwardly with an outward cant from the shoulder portion. The skirt portion extending entirely around the periphery of the high shield and being conformingly sized to receive therein the lip portion of the sifting trays such that a lower surface of the shoulder seats on the lip portion of the uppermost sifting tray when the system is in the use configuration. In embodiments, the high shield and the base tray are formed from pulp material, in embodiments, the at least two sifting trays, the base tray, and the high shield are all formed of pulp material comprising recycled cardboard.

The modular pet litter box system having a collapsed configuration that is used for storage, transporting the system or providing a packaged system for retail sale. In such configuration, the high shield is turned upside down defining an interior that then receives the at least two sifting trays and the base. The skirt portion of the high shield receives the stacked lip portions of the at least two sifting trays and the base, the four sidewall portions of the sifting trays and base are positioned inside the four wall portions of the high shield. The base and at least two sifting trays being nested inside the upside down high shield provides a robust package of the modular pet litter box system with the skirt portion of the high shield shielding the upper lip portions of the stacked sifting trays and base tray.

A feature and advantage in embodiments is a pulp sifting tray has an apertured bottom wall where except at sifting openings, there is not a corner with a radius less than 0.080 inches. Such allows easy removal from molds, facilitates sifting as the smooth upper surface of the bottom wall with rounded corners and does not significantly inhibit the sliding litter granules when sifting. In embodiments, ribs are positioned intermediate elongate sifting openings, the elongate openings in planar bottom wall portions. This further facilitates the movement of the litter on the bottom wall and the sifting action of allowing unclumped litter to fall through the elongate openings.

In embodiments, the floor panel of each sifting tray having two rows of a plurality of sifting openings alternating with a plurality of upwardly extending ribs. The openings are positioned in a lowermost level of the floor panel and each opening positioned in horizontally extending wall portions. That is, lengthwise edge wall portions defining each opening extend in a horizontal plane away from the opening. Each opening configured as an elongate opening with a constant width extending substantially a length of each respective opening. That is opposing edges of the wall portions defining each sifting opening are parallel to each other. In embodiments, the aspect ratio of opening length to opening width of each of the plurality of sifting openings is at least 3.0 to 1.0. In embodiments, the aspect ratio of opening length to opening width of each of the sifting openings is at least 5.0 to 1.0. The sifting openings may be linear or have a curvature. Similarly, the ribs are illustrated as generally linear but they also may have a curvature. Each of the upwardly extending ribs having an upwardly facing opening closing portion. In embodiments, each rib being plateau shaped with a flat upper surface, whereby the flat upper surface closes a respective opening of a sifting tray thereabove by an upward horizontal surface of the rib engaging the lower horizontal surface of the horizontal wall portion surrounding the opening. In an embodiment, the rib may have a protrusion that fits partially into the opening that is being closed. The openings and ribs being positioned such that is a first rotational position of a sifting tray above another like sifting tray, corresponding ribs and openings of the two sifting trays are aligned. In a second rotational position, with one of the sifting trays rotated 180° from the first rotational position, the openings of the upper tray are positioned above the ribs of the tray therebelow, the ribs closing the openings.

In embodiments, a stack sifting trays can include two differently configured sifting trays that cooperate with one another when nested together such that the lower tray blocks openings in the tray above, regardless of the 180° rotational orientation of the trays with respect to each other.

A feature and advantage of embodiments is the sifting openings are at a planar lowermost level of the bottom wall, the planar lowermost level extend to and between each of the four sidewall portions, the sifting openings being elongate and being formed in horizontal planar wall portions of the lowermost level, whereby the height of the wall portion that defines each sifting opening is equal to the thickness of the wall portion. The sifting openings at the lowermost level that extends to connects between all four sides allows litter to slide around horizontally on said lowermost planar level providing an efficient means of getting all of the litter to be exposed to the openings. That is, the litter granules are less inclined to get hung up in structure on the apertured bottom and can be actively and dynamically freely moved about the openings. Moreover, the minimal height of the wall portion defining the sifting openings minimizes the clogging of the openings by clumped litter or debris.

In embodiments of a stack of like configured sifting trays, each of the disposable sifting trays includes indicia configured such that when the indicia of a top tray is aligned with the indicia of an adjacent bottom nested tray, the sifting openings of each tray are aligned. Such alignment provides a minimal stacking height of the top tray and adjacent tray below. When the indicia of the top tray is not aligned with the indicia of the adjacent bottom nested tray, the upwardly extending ribs of the bottom tray align with the sifting openings of the top tray thereby blocking material from passing through the sifting openings of the top tray. In embodiments, the indicia is an arrow. In embodiments, the indicia is a notch defined by the lip. In embodiments, the disposable high shield comprises one or more ribs. In embodiments, the disposable high shield includes an enlarged edge portion configured to surround the lips of the disposable sifting trays. In embodiments, the enlarged edge portion comprises one or more ribs extending vertically from a bottom most perimeter of the enlarged edge portion to a top most perimeter of the enlarged edge portion. In embodiments, the disposable sifting trays, base tray, and high shield comprise a moldable pulp material.

A modular pet litter box system according to embodiments includes at least two pulp formed sifting trays positioned above and nested within a pulp formed base tray. Each pulp formed sifting tray includes a bottom wall having sifting openings and upwardly extending ribs. In a shipping configuration, the base tray is nested within a pulp formed high shield such that the high shield surrounds the base tray and the at least two disposable sifting trays. "Pulp" when used herein may refer to the wet pulp material pre-drying or pre-forming or the dried pulp material in the finished product, depending upon context.

In embodiments, the high shield comprises an enlarged edge portion and a wall portion such that in a use configuration the enlarged edge portion surrounds at least an upper lip of a disposable sifting tray and an upper lip of a base tray, and the wall portion extends away from the base tray. In embodiments, in the shipping configuration the modular pet litter box system is substantially rectilinear although with rounded corners. In embodiments, in the shipping configuration the modular pet litter box system is about 12-22 inches wide, about 16-25 inches long, and about 4-8 inches tall. In embodiments, the modular pet litter box system is about 18-20 inches wide, about 21-23 inches long, and about 6-8 inches tall.

In embodiments, the disposable pulp base tray and each of the disposable sifting trays comprise a lip around the periphery such that each lip is configured to nest within the lip of the layer above. In embodiments, the high shield includes a front wall opposite a back wall, and a left wall opposite a right wall. Each wall includes a top edge opposite a bottom edge, and the front wall is shorter than the back wall, as measured from the bottom edge to the top edge.

In embodiments, the top edge of each wall of the high shield defines a first opening, and the bottom edge of each wall defines a second opening. In embodiments, the second opening of the high shield is wider, as measured from the left wall to the right wall, and longer, as measured from the front wall to the back wall, than the first opening.

According to an embodiment, a method of using a modular pet litter box system includes providing a modular pet litter box system in the shipping configuration; removing the high shield and separating each of the at least two disposable sifting trays; orienting and nesting each of the at least two disposable sifting trays such that the upwardly extending ribs of a first sifting tray block the sifting openings of a sifting tray nested immediately above the first sifting tray; placing the oriented and nested sifting trays within the base tray; filling a top most disposable sifting tray with a granular material; placing the high shield atop the top most disposable sifting tray; allowing a pet to place waste in the top most disposable sifting tray; sifting the granular material to an adjacent disposable sifting tray while retaining the pet waste in the top most disposable sifting tray; and disposing of the top most disposable sifting tray and the pet waste retained therein.

In embodiments, a circumferential lip surrounds a top peripheral edge of base tray; circumferential lip may have a vertical height between 0.1 inches and 1 inch and a horizontal projection between 0.2 inches and 1 inch. In embodiments, base tray may have a width between about 12 and 22 inches and a length between 18 and 25 inches in the horizontal plane. In embodiments, base tray may have a vertical height between about 2.5 and 8 inches. In embodiments, an enlarged edge portion surrounds a bottom peripheral edge of a high shield or lid, the edge portion configured for seating on the circumferential lip of one or more sifting trays. The edge portion may define a shoulder and skirt portion. In embodiments, the enlarged edge portion of the shield or lid may have a vertical height between 0.5 inches and 3 inches and a lateral or horizontal projection between 0.1 inches and 2 inches. In embodiments, a bottom portion of a high shield has a length between 16 and 25 inches. In embodiments, a bottom portion of a lid has a width between 12 and 22 inches. In embodiments, a top portion of a lid has a length between 15 and 24 inches. In embodiments, a top portion of a lid has a width between 10 and 20 inches. In embodiments, the thickness of the trays and shield formed of pulp material can suitable be about 0.05 inches to about 0.13 inches. In embodiments, the thickness of the trays and shield formed of pulp material can suitable be about 0.10 inches to about 0.20 inches. The wall thickness of each tray and the shield may be generally uniform to plus or minus 50% of an average wall thickness of the particular component. Wall thickness can vary depending of the particular pulp utilized and the size of the component.

In embodiments, a projecting circumferential lip surrounds a top peripheral edge of a sifting tray having a vertical height between 0.1 and 1.0 inches and a horizontal projection between about 0.2 and 1.0 inches. In embodiments, a sifting tray may have a width between about 12 and 22 inches and a length between about 16 and 25 inches in the horizontal plane. In embodiments, a sifting tray may have a vertical height between about 4 and 8 inches. In embodiments, ribs or plateaus may extend upwardly from a bottom wall of a sifting tray between 0.1 and 1.0 inches. In embodiments, openings in a bottom panel of a sifting tray may have a length between 1 and 3 inches. In embodiments, openings in a bottom wall of a sifting tray may have a width between about 0.15 and 0.6 inches. In embodiments, openings in a bottom wall of a sifting tray may have a width between about 0.25 and 0.50 inches.

Components of the litter tray system, such as a high shield, base tray, and one or more sifting trays, may be formed from recycled cardboard, paper pulp, bagasse, bamboo, wheat straw, or any fibrous plant based pulp material. In embodiments, components of the system are pressed or molded in conventional fashion. In embodiments, specific components of the modular pet litter system may be polymers or metallic or ceramic materials. Certain inventive aspects are not dependent upon the specific composition of the components.

Although molding pulp, particularly pulps such as recycled cardboard, cannot provide the extremely precise shape and dimensional control, the inventor has, in embodiments, shown with the configurations and structures herein, that pulp based components, including sifting trays with multiple openings, are of adequate strength for providing a litter box system in a shipping transport configuration that is readily packagable for retail sale, not needing additional boxing of the product, and that the packaged product conveniently stacks, including on pallets in an interlocking manner. The inherent high coefficient of friction of exposed pulp material engaging pulp material prevents slippage among the packaged components and with the nested arrangement provides a robust assembled package. The packaged components can have pulp based components exposed, that is not beneath clear polymer bags for example. The high friction between pulp components secure the stacked packaged products.

Additionally, the inventor has, in embodiments, shown with the configurations and structures herein, that pulp based components are of adequate strength for providing a litter box system with sifting trays in a use configuration. The high coefficient of friction, particularly compared to plastic components, of the tray pulp material engaging other trays or the shield provides inherent adhesion of the components adding to the structural stability of the assembled system. Moreover, the reduced rigidity of the pulp formed components allow for limited deformation when assembling the components in either the collapsed storage/transport configuration or in the use configuration. The minimal resilience with the pulp based material is deformed contributes to the adhesion but does not inhibit disassembly of the components.

A feature and advantage is that the inventor has discovered that the deformability, the inherent but limited resilience, and the high coefficient of friction of pulp formed components combine to provide a sifting litter system convertible from a collapsed shipping/transport mode to a use mode and having a more than adequate structural strength in either mode.

A feature and advantage of embodiments discovered by the inventor is that, compared to plastic tray components, the pulp based trays provide improved airflow to the litter keeping it dryer, extending its life, and reducing odors. The permeability of the pulp based components, compared to plastic components, allow air and moisture to pass through the tray wall portions, compared to plastic trays that for all practicable purposes are totally impermeable to moisture and air. Additionally, the molding imprecision associated molded pulp products preclude the tray components from nesting tightly together. That is, even though the apertures of a pulp based sifting tray bottom wall are blocked by the ribs of the pulp based sifting tray there below, the blocking is tight enough to stop litter from falling therethrough, the engagement is loose enough such that air can still pass through to aid in the drying of litter and/or excrement.

A feature and advantage of embodiments is that the pulp material, as well as rounded structure of the upwardly projecting ribs provides an ideal scratching surface for cat claws when the cat flicks her paws rearwards to cover the cat's excrement. The pulp material provides a resistance to the claws that minimizes the velocity of the paw, is paw friendly, and thus minimizes the spray of the flicked litter. Additionally, the top surface of the bottom wall of the sifting trays have rounded corners of the ribs prevent the catching of the cat's claws at sharp—low radius corners. A feature and advantage of embodiments, it that to the extent the surface of the pulp sifting trays are scratched, the air and moisture permeability of the pulp formed trays minimize moisture from collecting in the scratches and thereby minimize any bacteria growth. A feature and advantage of embodiments, is that scratching the shifting trays does not cause sloughing of plastic particles containing BPA.

A feature and advantage of a pet litter system using pulp based components, the sifting trays, the base tray, and the shield, is that molding such materials has a low impact on the environment compared to molding polymers. The pulp material may be easily formed from recycled cardboard, for example, by mixing and adding water, the pulp material does have to been heated to become flowable, as polymers do, and the pulp material rigidifies by drying. The pulp molds do not require the precision manufacture of plastic injection molding molds, do not have to withstand the extreme pressures of plastic injection molding operations, and are therefore easier to use and much less expensive thereby providing for a more reasonably priced product for the consumer. Additionally disposal of the used pulp based components is environmentally friendly, the components readily degrade in days or weeks compared to decades or centuries for plastic components. Disposal of pulp components have very limited impact on the environment compared to disposal of or even the recycling of plastic components.

A feature and advantage of embodiments is being able to readily separate excrement from litter allowing for the disposable of excrement and reuse of litter utilizing pulp based disposable sifting tray components.

A feature and advantage of the disclosure is the ability to remove excrement from litter without requiring the use of additional tools such as shovels or gloves utilizing pulp based sifting tray components.

A feature and advantage of the disclosure is the ability to separate excrement from litter without requiring direct exposure to unsanitary items utilizing pulp based sifting tray components.

A feature and advantage of the disclosure is the ability to easily dispose of any components, such as trays, that become soiled with unsanitary biological waste matter where the disposal has minimal impact on the environment.

A feature and advantage of the disclosure is the ability to limit the amount of litter sprayed when a pet buries excrement in a sifting tray system.

A feature and advantage of the disclosure is the reduction of undesirable waste byproducts such as plastics in a sifting tray pet litter box system.

A feature and advantage of the disclosure is easily orienting the trays into a use configuration through the use of readily identifiable indicia that may be provide in molding pulp trays.

A feature and advantage of pulp based base trays, sifting trays, and shields is that they are very light weight, weighing from 5 ounces to 20 ounces for each component.

A feature and advantage of embodiments of pulp sifting trays are structural features on the bottom of the trays that facilitate use of pulp material, specifically providing rigidity, strength, and rounded corners, and that simultaneously facilitate efficient sifting of used litter.

In embodiments, the pulp based sifting trays may be utilized in existing pet litter boxes or litter box systems. For example, the pulp based sifting trays may be conformingly sized to an existing commonly sized plastic litter box tray, two or more of the sifting trays may be provided and inserted in the base tray and utilized as described herein. As such, embodiments include adding pulp formed sifting trays to existing systems. Such a system may include a polymer base tray with a closed bottom wall and an upper shield fitted and attached to the polymer tray. One or more sifting trays sized to fit into the polymer base tray are inserted into the base tray. Such one or more pulp based sifting trays when added to an existing plastic litter box advantageously provide a barrier between the litter material and the plastic of the base tray, thereby elimination clawing contact with the plastic surface of the base tray, minimizing the potential for bacteria growth on the plastic surface, providing a material with more of an attractant odor and texture, a more pleasing surface texture and a cleaner, easier, and more convenient method of eliminating pet waste, compared to the plastic litter box.

In an embodiment, a collapsed litter box system may have pulp based sifting trays and a plastic base tray and/or a plastic shield. The plastic base tray then will not, in the normal use of the litter box system, have the litter and pet excrement directly therein, rather it will be held by the stack of sifting trays thereabove. Such an arrangement is consistent with most of the environmental advantages of the pulp based system and does not suffer the disadvantages of the systems with the plastic sifting trays. Since the base tray does not directly hold the litter, it is not subject to the scratching nor the soiling associated with the plastic trays that directly hold litter. Soiled sifting trays can be disposed of with minimal environmental impact.

A feature and advantage of embodiments is that retailers can stock a pulp based pet litter box system that will have components discarded by customers in an environmentally friendly manner and that will then require the customers to return to purchase additional environmentally friendly pulp based components. Thus, a feature and advantage of embodiments is repeat sales of the product not associated with plastic based pet litter boxes or systems.

Certain features and advantages of embodiments do not require the pulp based componentry for novelty and inventiveness. For example, the pet litter box system with the shipping/transport mode and the use mode comprising the base tray, the shipping tray and the shield that cooperatively and conformingly assemble in both modes. Moreover the configuration of the apertured bottom wall of the sifting trays provides advantages not dependent upon the material from which it is formed. In embodiments, pulp based components may have a layer of polymer or other material to provide a particular characteristic.

The above summary is not intended to describe each illustrated embodiment or every implementation of the present disclosure.

BRIEF DESCRIPTION OF THE DRAWINGS

FIG. 3A is a perspective top view of a high shield according to an embodiment of the disclosure.

FIG. 3B is a perspective bottom view of a high shield according to an embodiment of the disclosure.

FIG. 3C is a top view of a high shield according to an embodiment of the disclosure.

FIG. 3D is a side view of a high shield according to an embodiment of the disclosure.

FIG. 3E is a back view of a high shield according to an embodiment of the disclosure.

FIG. 3F is a front view of a high shield according to an embodiment of the disclosure.

DETAILED DESCRIPTION

Figure 1A:
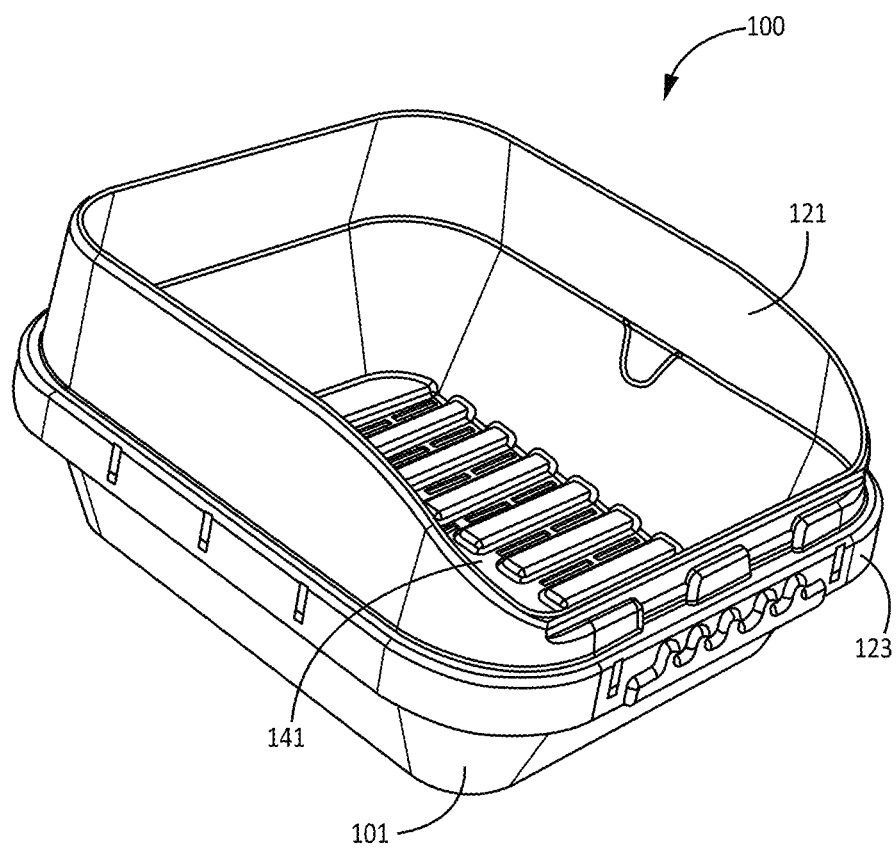
FIG. 1A is a perspective front view of a modular pet litter box system according to an embodiment of the disclosure.
Figure 1B:
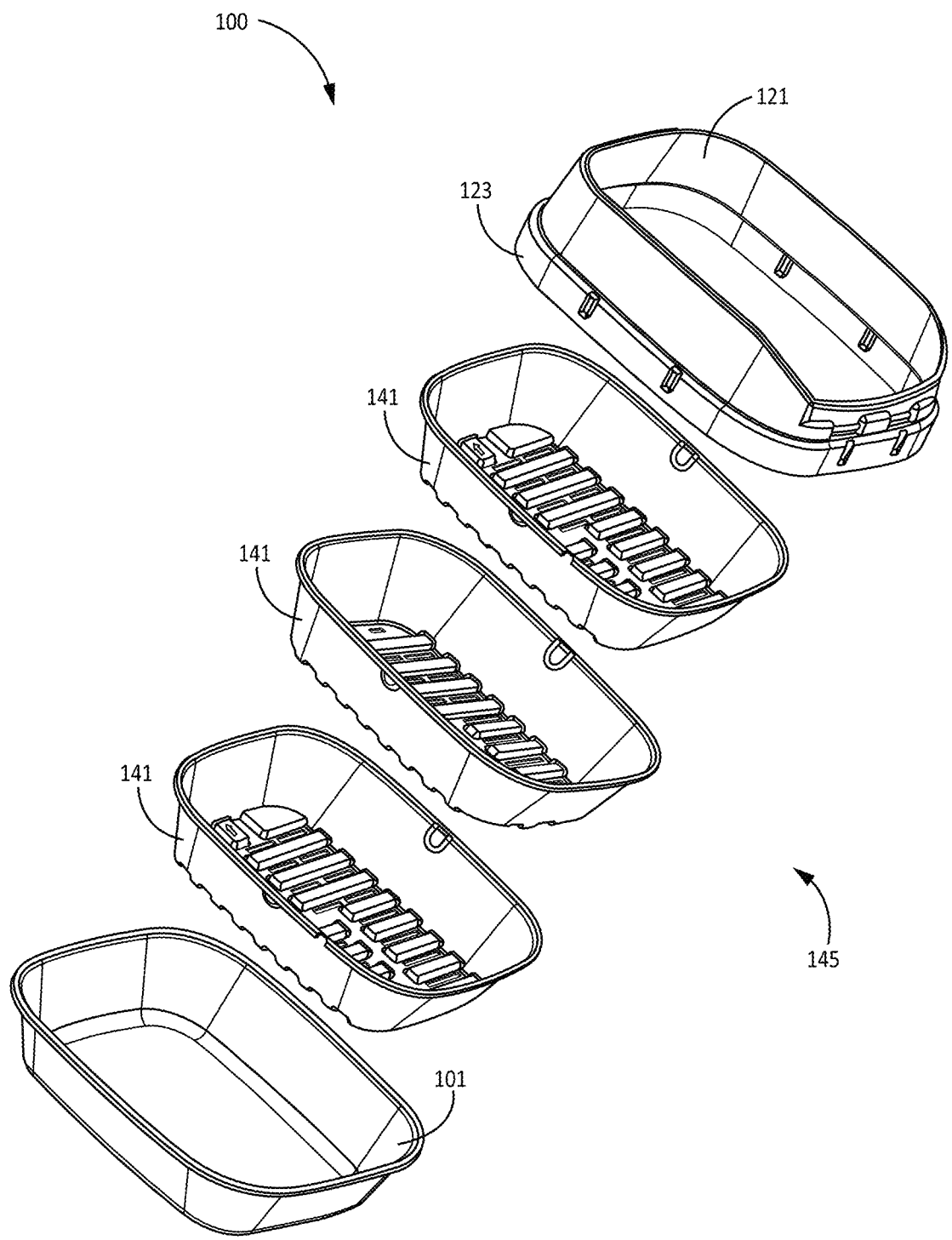
FIG. 1B is an exploded perspective front view of a modular pet litter box system according to an embodiment of the disclosure.
Figure 2A:
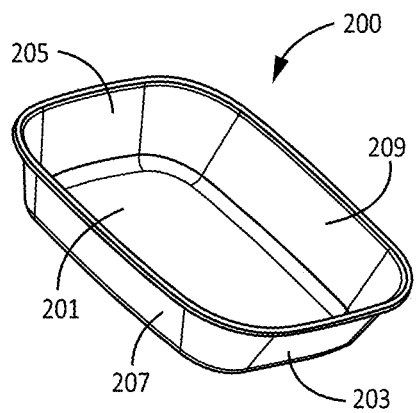
FIG. 2A is a perspective top view of a base tray according to an embodiment of the disclosure.
Figure 2C:
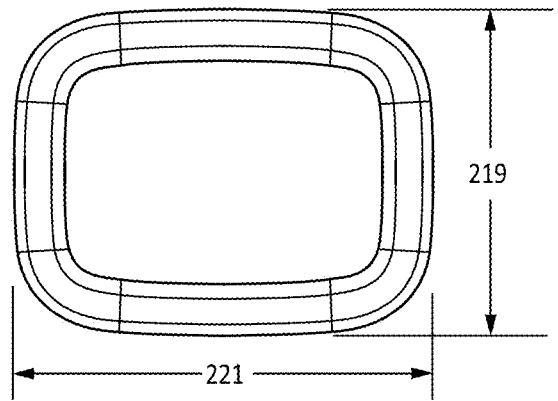
FIG. 2C is a top view of a base tray according to an embodiment of the disclosure.
Figure 2D:
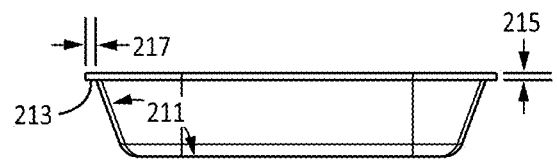
FIG. 2D is a side view of a base tray according to an embodiment of the disclosure.
Figure 2B:
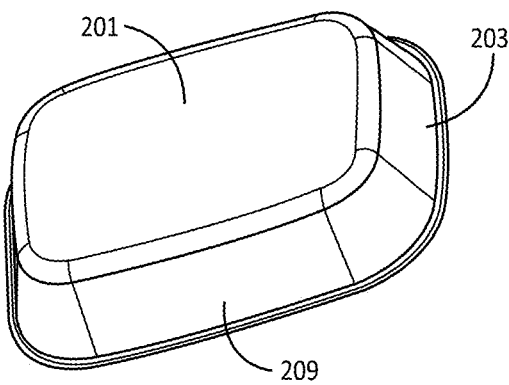
FIG. 2B is a perspective bottom view of a base tray according to an embodiment of the disclosure.
Figure 2E:
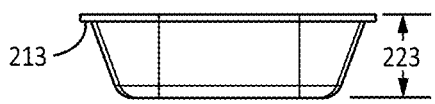
FIG. 2E is a front view of a base tray according to an embodiment of the disclosure.
Figure 4C:
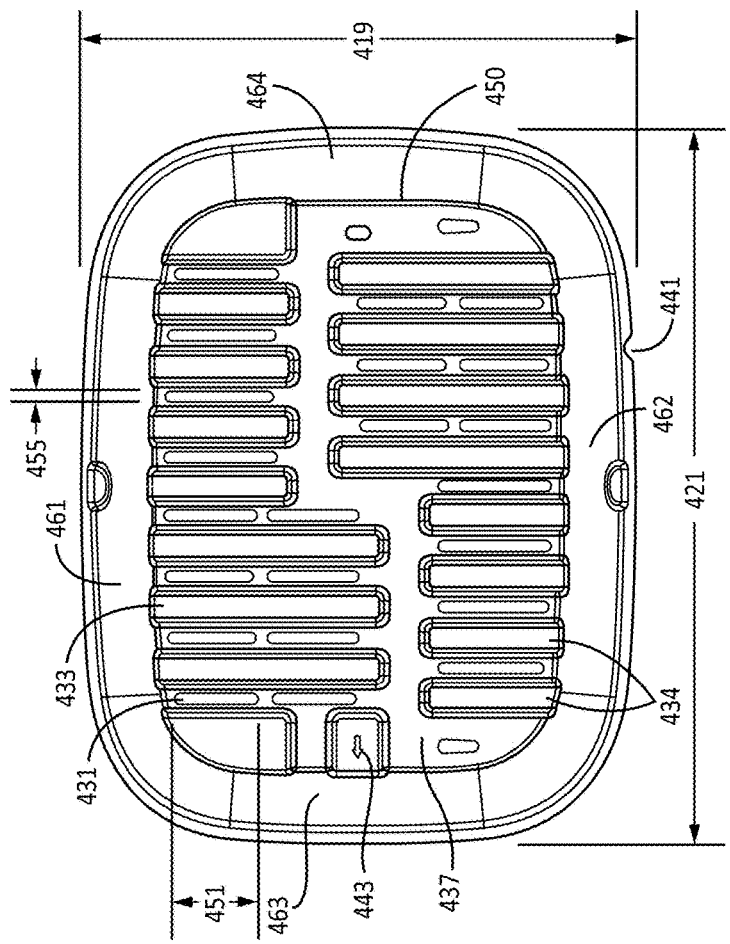
FIG. 4C is a top view of a sifting tray according to an embodiment of the disclosure.
Figure 4D:
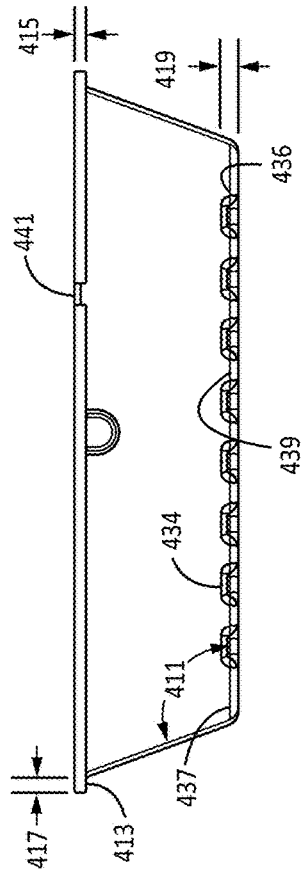
FIG. 4D is a side view of a sifting tray according to an embodiment of the disclosure.
Figure 4A:
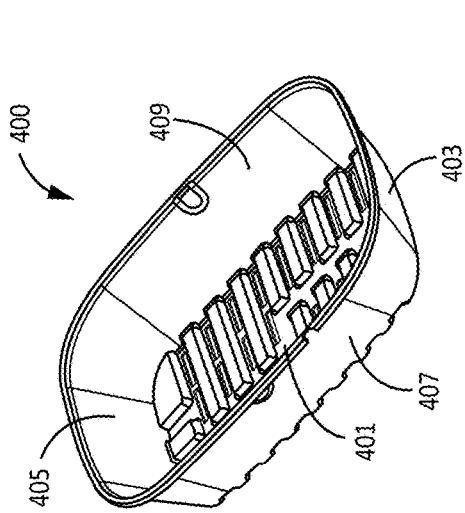
FIG. 4A is a perspective top view of a sifting tray according to an embodiment of the disclosure.
Figure 4B:
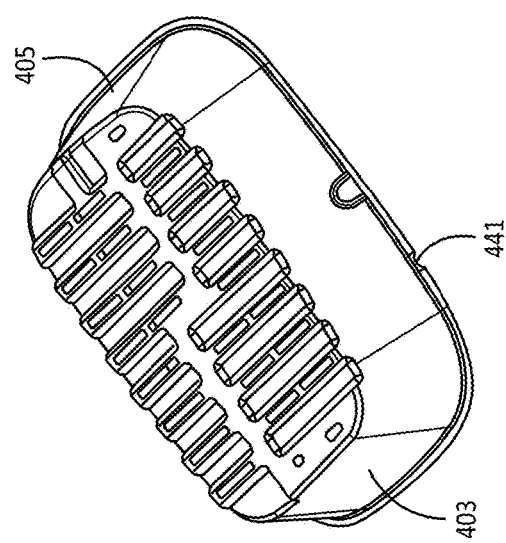
FIG. 4B is a perspective bottom view of a sifting tray according to an embodiment of the disclosure.

Referring to FIGS. 1A-1B, a modular pet litter box system 100 is illustrated in a use configuration having a disposable base tray 101, a lid or disposable high shield 121, and at least one disposable sifting tray 141. Sifting trays 141 nest within base tray 101. Lid 121 sits atop the nested trays 101, 141 and an enlarged edge portion 123 of lid 121 surrounds the upper periphery of nested trays 101, 141. A stack 145 of one or more sifting trays 141 in a use configuration may further be nested within base 101.

Referring to FIGS. 2A-2E, base tray 200 has a unitary bottom wall 201, front wall 203 opposite rear wall 205, and left wall 207 opposite right wall 209. Walls 203, 205, 207, 209 extend upwardly along a vertical axis from bottom wall 201. In embodiments, walls 203, 205, 207, 209 join one another at right angles. In embodiments, walls 203, 205, 207, 209 join one another at rounded corners. In embodiments, walls 203, 205, 207, 209 define a 90 degree angle 211 with bottom wall 201. In embodiments, walls 203, 205, 207, 209 define an angle 211 greater than 90 degrees with bottom 201. In embodiments angle 211 is between 90 degrees and 140 degrees. In embodiments, angle 211 is 110 degrees. In embodiments, walls 203, 205, 207, 209 and bottom wall 201 define a bowl like cavity capable of retaining items such as granular litter or additional trays.

In embodiments, a circumferential lip 213 surrounds a top peripheral edge of base tray 200. Circumferential lip 213 may have a vertical height 215 between 0.1 inches and 1 inch and a horizontal projection 217 between 0.2 inches and 1 inch. In embodiments, vertical height 215 is 0.2 inches. In embodiments, horizontal projection 217 is 0.5 inches. Base tray 200 may have a width 219 between 11 and 18 inches and a length 221 between 15 and 20 inches in the horizontal plane. Base tray 200 may have a vertical height 223 between 2.5 and 5.5 inches.

Referring to FIGS. 3A-3F, high shield 300 has a top portion 301 opposite a bottom portion 302, front wall 303 opposite rear wall 305, and left wall 307 opposite right wall 309. Walls 303, 305, 307, 309 extend upwardly along a vertical axis. In embodiments, walls 303, 305, 307, 309 join one another at right angles. In embodiments, walls 303, 305, 307, 309 join one another at rounded corners. In embodiments, walls 303, 305, 307, 309 define a circumferential ring. The circumferential ring can provide a shield that may prevent litter being sprayed outside modular pet litter box system 100 when an animal paws at the litter, for example, during an attempt to bury excrement. In embodiments, top portion 301 is open. In embodiments, top portion 301 is unitary, forming a solid lid.

In embodiments, an enlarged edge portion 313 surrounds a bottom peripheral edge of lid or shield 300. Enlarged edge portion 313 may have a vertical height 315 between 0.5 inches and 3 inches and an inward horizontal projection 316 between 0.05 inches and 1 inch. In embodiments, shield bottom edge portion 302 configured as a skirt portion 303 and a shoulder portion 304 has a width 321 of between 12 and 22 inches that is wider and/or longer dimensionally than shield top portion 301 width 321 when measured in the horizontal plane. In embodiments, bottom portion 302 has a length 319 between 16 and 25 inches. In embodiments, bottom portion 302 has a width 321 of between 16 and 25 inches. In embodiments, top portion 301 has a length 325 between 15 and 24 inches and is less than the length of the bottom portion. In embodiments, top portion 301 has a width 327 between 14 and 24 inches and is less than the width of the bottom portion. In embodiments, enlarged edge portion 313 may have a slight outward taper towards the bottom peripheral edge of lid 300. In embodiments, the slight outward taper be between 90 and 100 degrees. A slight outward taper may be advantageous for lid enlarged edge portion 313 to surround other elements of modular pet litter box system 100.

In embodiments front wall 303 is vertically shorter than rear wall 305. In embodiments, left and right walls 307, 309 taper towards front wall 303. In embodiments, lid 300 has a vertical height 323 between 3 and 8 inches.

Referring to FIGS. 4A-4D, sifting tray 400 has a bottom wall 401, front wall 403 opposite rear wall 405, and left wall 407 opposite right wall 409. Walls 403, 405, 407, 409 extend upwardly along a vertical axis from bottom wall 401. In embodiments, walls 403, 405, 407, 409 join one another at right angles. In embodiments, walls 403, 405, 407, 409 join one another at rounded corners. In embodiments, walls 403, 405, 407, 409 define a 90 degree angle 411 with bottom wall 401. In embodiments, walls 403, 405, 407, 409 define an angle 411 greater than 90 degrees with bottom wall 401. In embodiments angle 411 is between 90 degrees and 140 degrees. In embodiments, angle 411 is 105 degrees. In embodiments, angle 411 of sifting tray 400 generally matches angle 211 of base tray 200. In embodiments, walls 403, 405, 407, 409 and bottom wall 401 define a bowl like cavity capable of retaining items such as solid excrement or additional trays.

In embodiments, a circumferential lip 413 surrounds a top peripheral edge of sifting tray 400. Circumferential lip 413 may have a vertical height 415 between 0.1 inches and 1 inch and a horizontal projection 417 between 0.2 inches and 1 inch. In embodiments, vertical height 415 is 0.2 inches. In embodiments, horizontal projection 417 is 0.5 inches. Sifting tray 400 may have a width 419 between 12 and 22 inches and a length 421 between 16 and 25 inches in the horizontal plane. Sifting tray 400 may have a vertical height 423 between 4 and 8 inches.

In embodiments, sifting tray 400 may have openings 431 that are flush with the bottom panel 401 and surface of the sifting tray. A sifting tray 400 may have ribs 433 with flattened top surfaces 434, such that the structure is suitable termed a plateaus 433 extending upwardly from the bottom surface 401 of the sifting tray 400. Ribs or plateaus 433 may be generally rectilinear in shape. Ribs or plateaus 433 may have a height 419 between 0.1 and 1.0 inches. In embodiments, ribs or plateaus 433 may have rounded corners. Ribs or plateaus 433 may be either uniform or staggered. Ribs or plateaus 433 may extend from walls 403, 405, 407, 409. In embodiments, ribs or plateaus 433 be self-contained such that they do not contact a wall 403, 405, 407, 409. In embodiments, a portion of ribs or plateaus 433 may conform to the shape of wall 2 403, 405, 407, 409 or corners of sifting tray 400. In embodiments, ribs or plateaus 433 may extend upwardly from bottom wall 401 between 0.1 and 1.0 inches. Openings 431 are illustrated as elongate but may be a variety of shapes. For example, openings 431 may be oblong, circular, oval, rectangular, triangular, or any other suitable shape configured to act like a sieve. Openings 431 may be generally uniform throughout. In embodiments, openings 431 may take on a variety of shapes or sizes throughout the sifting tray 400. For example, in embodiments, an opening 431 closer to a corner of sifting tray 400 may have a different size or shape than a more centrally situated opening 431. In embodiments, opening 431 may have a length 451 between 1 and 3 inches. In embodiments, opening 431 may have a width 455 between 0.1 and 0.5 inches.

In embodiments, the bottom wall of the sifting trays does not have a traverse on the planar top surface that extends from end to opposite end or side to opposite side that is uninterrupted by a rib. Moreover, in embodiments, no rib extends all the way from one lateral sidewall 461 to the opposing lateral sidewall 462, nor from an end sidewall 463 to an opposing end sidewall 464. This lack of linear spanning bottom wall portion provides structural rigidity facilitating the use of pulp materials for the sifting tray. Moreover, in embodiments, each elongate sifting opening is not positioned laterally adjacent to another elongate sifting opening without ribs being therebetween. In embodiments, most of the elongate sifting openings are not positioned laterally adjacent to another elongate opening without ribs being therebetween. In embodiments, the length of the openings of the sifting trays is limited to less than 3 inches and a width less than about 0.5 inches. In embodiments, the grid is laid out with two rows of elongate ribs or plateaus alternating with elongate openings, the directions of the elongations of each of the elongate ribs or plateaus and each of the openings being traverse to the direction that said row extends. In embodiments, the bottom wall has two rows of alternating elongate ribs or plateaus and elongate openings. In an embodiment with two rows of alternating ribs or plateaus and elongate openings, each elongate rib or plateau in one row is aligned with one or more elongate openings in the other row. And accordingly, each elongate opening in one row is aligned with an elongate rib or plateau in the other row. In embodiments each row has at least 6 ribs or plateaus and at least 6 or more elongate openings. In embodiments each row has less than 15 ribs or plateaus and less than 15 or more laterally arranged elongate openings. In embodiments, the layout may be changed by adding more or less, or bigger or smaller openings 431 to allow litter to pass through. Differences in the shape, size, depth, and angle of ribs 433 are within the scope of this disclosure.

Figure 5A:
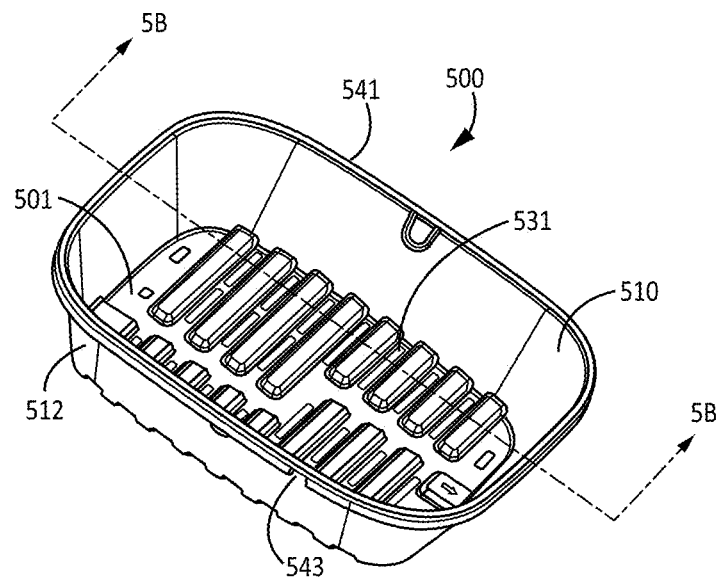
FIG. 5A is a perspective view of nested sifting trays in a use configuration according to an embodiment of the disclosure.
Figure 5B:
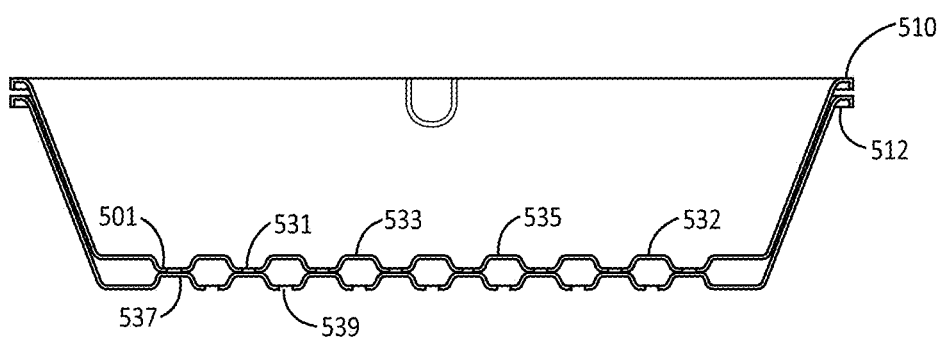
FIG. 5B is a cross-sectional view of nested sifting trays in a use configuration according to an embodiment of the disclosure taken at line 5B-5B of FIG. 5A.
Figure 5C:
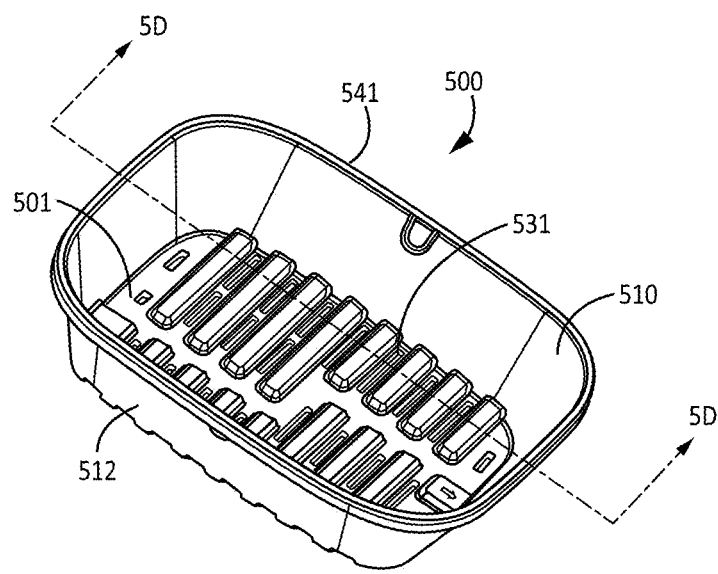
FIG. 5C is a perspective view of nested sifting trays according to an embodiment of the disclosure.
Figure 5D:
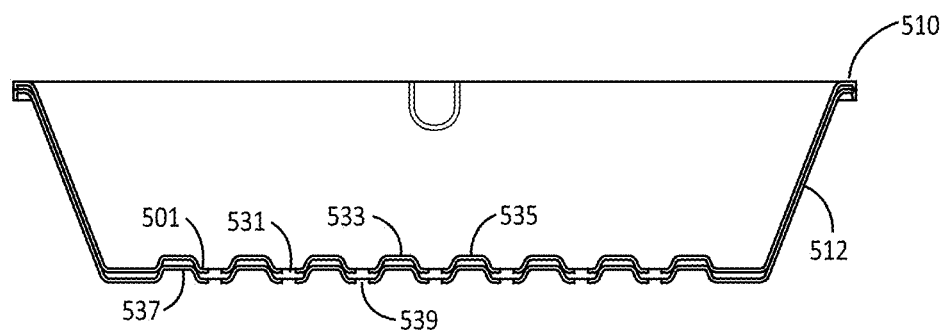
FIG. 5D is a cross-sectional view of nested sifting trays in a compact shipping configuration according to an embodiment of the disclosure taken at line 5D-5D of FIG. 5C.
Figure 5E:
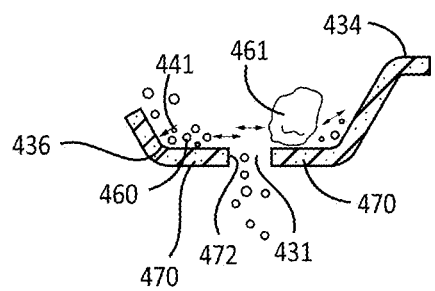
FIG. 5E is a cross-sectional view of a bottom wall portion of the bottom wall at a sifting opening.

Continuing to refer to FIGS. 4A-4D, and also referring to FIG. 5E, in embodiments, the ribs 433 project upwardly 0.17 to 0.30 inches from the top surface 434 of a lowermost level of the bottom wall. The ribs may have a horizontal width of from 0.40 to 1.0 inches and a length of from 2 inches to 8 inches. The corner 436 between the top planar surface 437 of the lowermost level 439 and the projecting rib may have a radius of curvature 441 of greater than 0.05 inches in embodiments. In embodiments, the radius of curvature may be greater than 0.08 inches. In embodiments, the radius of curvature may be greater than 0.12 inches. The radius of curvature of the corner 450 between the bottom wall and each of the outwardly canted sidewalls may be greater than 0.05 inches, in embodiments greater than 0.08 inches, in embodiments greater than 0.12 inches. The corners with relatively large diameter radius of curvature, and the horizontal planar walls on the opposing sides of the openings 431 facilitate horizontal sliding of the litter 460 and debris 461 in the tray. The openings 431 are defined by planar horizontal wall portions 470 with edges 472 at the opening. The length or height 477 of the opening equals the thickness of the wall portion at the opening.

Sifting tray 400 may have indicia to easily permit a user to determine an orientation of the sifting tray 400, the purpose of which is explained below. In embodiments, indicia may be a notch 441 in the circumferential lip 413 of sifting tray 400. In embodiments, indicia may be a marking 443 embossed in bottom wall 401 or ribs or plateaus 433. For example, marking 443 may be an arrow. Other visible indicia in the forms of markings, notches, or the like are not beyond the scope of this disclosure.

Referring to FIGS. 5A-5D, sifting trays 510, 512 may be combined in a stack 500 in a use configuration. The openings 531 flush with the bottom panel 501 are blocked by the ribs flattened top surfaces 532 or plateaus 537 of a like tray 512, rotated 180 degrees, and stacked below the sifting tray 510. Similarly, the ribs or plateaus 533 may have flat surfaces 535 that are positioned such that each engage and block the openings of a like tray, rotated 180 degrees, stacked above the sifting tray 510. Although FIG. 5A illustrates only two sifting trays 510, 512, any number of trays 510, 512 is not beyond the scope of this disclosure. One skilled in the art will appreciate that additional sifting trays 510 may be added above a top most or below a bottom most tray 510,512 and be incorporated into stack 510. So long as each tray 510 is rotated 180 degrees as compared to a tray 512 immediately above or below, openings 531 will continue to be blocked by ribs or plateaus 537. The blocking of the openings creates a barrier inhibiting the flow of litter so that litter does not pass downwardly through the openings to a lower sifting tray unless and until the sifting tray is lifted. In embodiments, ribs or plateaus 537 may have an upwardly extending projection or crown 516 that extends into openings 531 of the tray thereabove 510, thereby further inhibiting the downward flow of litter. In embodiments, sifting trays 510, 512 may be nested in the same orientation creating a stack 500 in a shipping configuration. In a shipping configuration openings 531 of sifting tray 510 align with openings 539 of a tray 512 immediately below. While the shipping configuration is not conducive to retaining contents, such as litter, within sifting trays 510, 512, it does have the advantage of reducing space between trays 510, 512. One will appreciate that as more trays 510 are incorporated into stack 500, this space saving becomes compounded. One will further appreciate that as additional trays 510 are incorporated into the stack 500, transitioning a stack 500 between a use and a shipping configuration entails ensuring that each tray 510 is rotated 180 degrees as compared to a tray 512 either immediately above or below tray 510. As discussed above, trays 510, 512 may have indicia to facilitate this task. When each tray 510 in a stack 500 has indicia in alignment, it is readily apparently to the user that stack 500 is in a shipping configuration and therefore objects such as litter will pass through stack 500. Similarly, a user can readily ascertain that when indicia alternate between adjacent trays 510, stack 500 is in a use configuration and will inhibit contents such as litter from flowing downward from one tray 510 to the next tray 512.

Figure 6A:
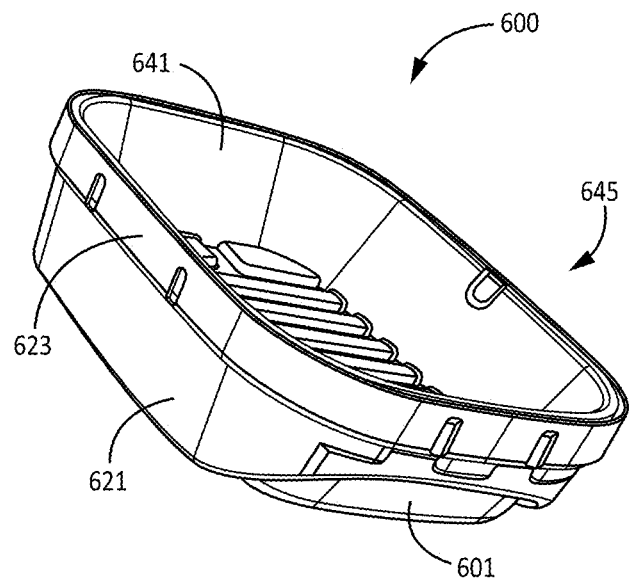
FIG. 6A is a top perspective view of a pet litter box system in a shipping configuration.
Figure 6B:
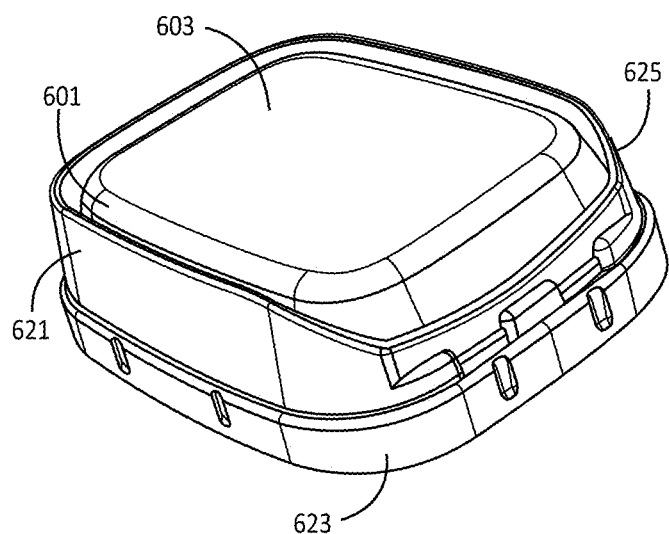
FIG. 6B is a bottom perspective view of a pet litter box system in a shipping configuration.
Figure 6C:
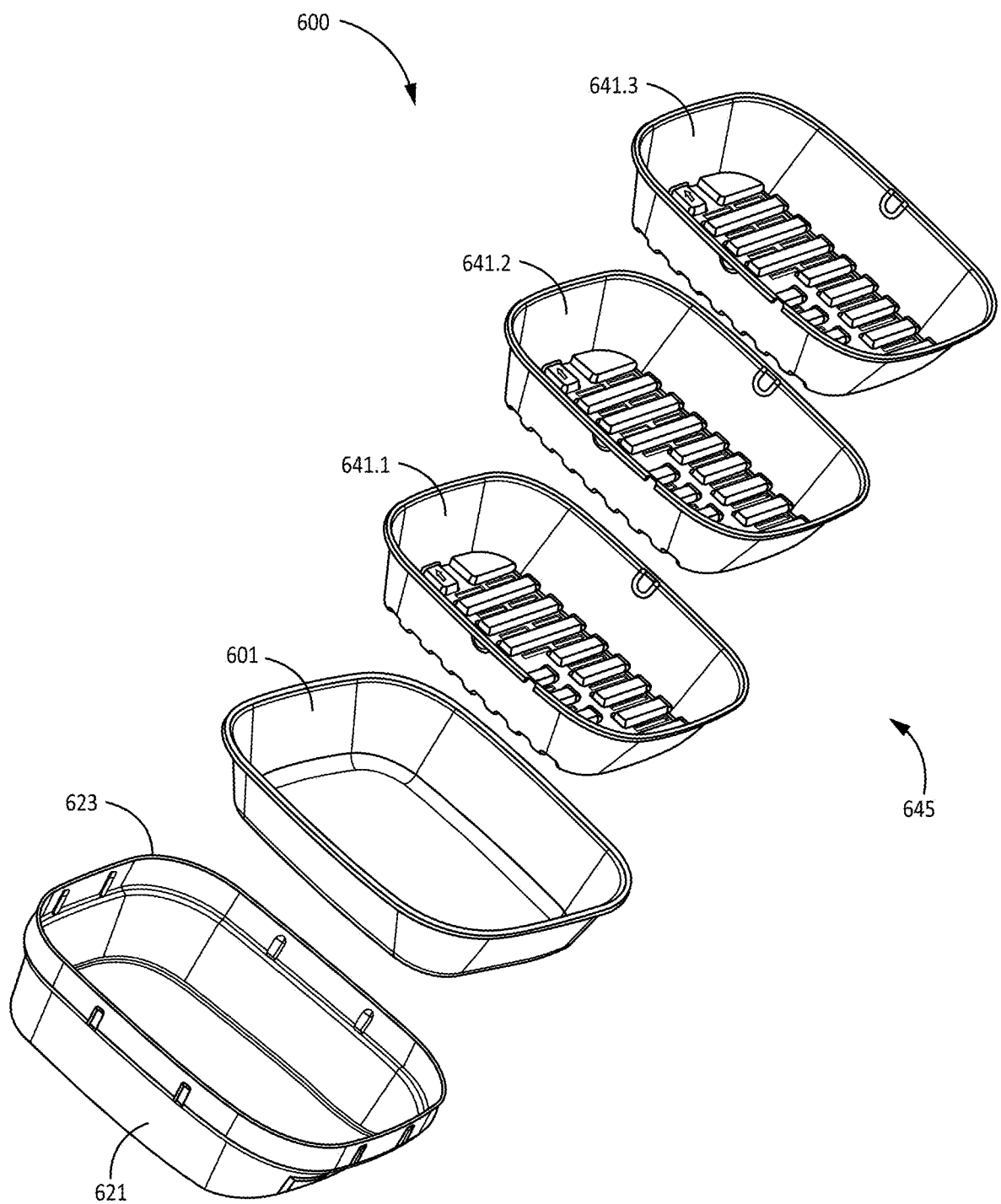
FIG. 6C is an exploded perspective view of a pet litter box system in a shipping configuration.
Figure 6D:
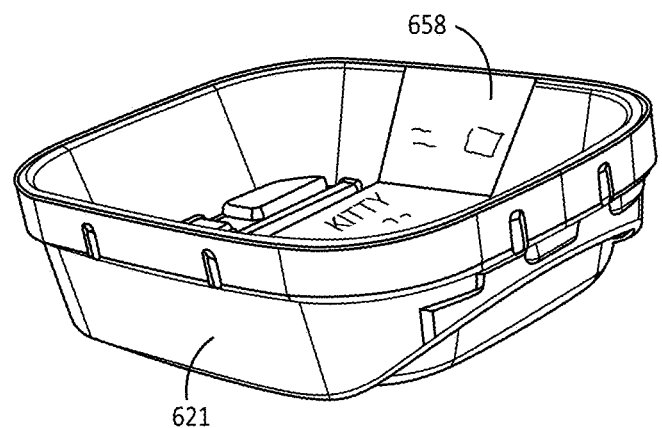
FIG. 6D is a perspective view of a pet litter box system in a shipping configuration with a label therein.
Figure 6E:
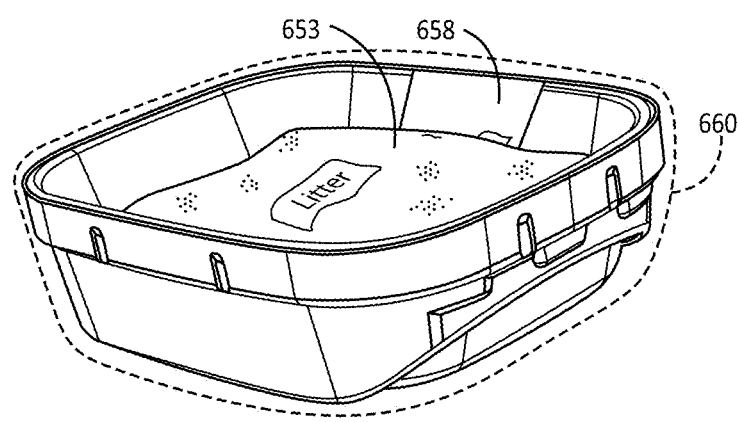
FIG. 6E is a perspective view of a pet litter box system in a shipping configuration with a label therein, a bag of pet litter therein, and a bag enclosing same.

During transport or storage of a stack 500 or pet litter box system 100, it may be advantageous to reduce the amount of space consumed by stack 500 or the system 100. To further reduce the space consumed by pet litter box system 600, as depicted in FIGS. 6A-6E, lid 621 may be inverted and base 601 inserted into lid 621 such that bottom wall 603 of base 601 is situated generally within an upper portion 625 of lid 621. A stack 645 of one or more sifting trays 641.1, 641.2, 641.3 in a shipping configuration may further be nested within base 601. The three sifting trays may be aligned as illustrated in FIG. 6C for maximum compactness or the middle of three sifting trays may rotated 180° to be in a ready-to-use configuration. Even though lid 601 is inverted, it will be appreciated that enlarged edge portion 623 still surrounds the upper periphery of trays 601, 641. By capturing trays 601, 641 within the enlarged edge portion 623, trays 601, 641 will not readily slide or otherwise separate from one another during shipping or in storage. As many bulk transport carriers base fees upon shipping size, minimizing space consumed in a shipping configuration may result in beneficial cost savings. Stacking trays 601, 641 within inverted lid 621 as described may add further structural support to the system 600. Crushability is a consideration for shipping and storage. The added rigidity found from stacking the components of system 600 as described may reduce damage incurred from external forces such as during shipping. Further, a kit 650 is contemplated which might include any combination of a lid 621, a base 601, one or more sifting trays 641, one or more bags of litter 653. In embodiments, bags of litter 653 may be placed within the uppermost tray 641 of system 600, such that the kit is in a compact unit. A cardboard label 658 with graphic bridges across the upper sifting tray or along the sides and bottom and bag of litter. A plastic transparent bag 660 may enclose the entire kit.

Figure 7:
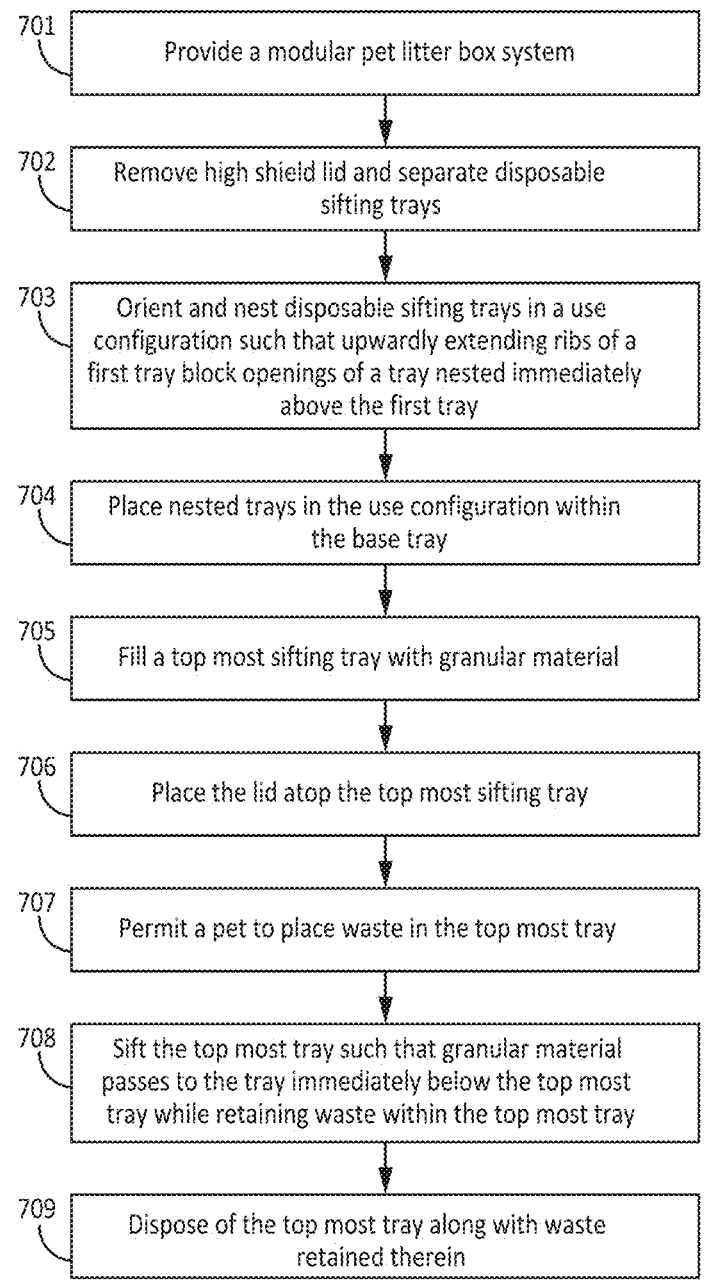
FIG. 7 illustrates a method of using a pet litter box system.

Referring to FIG. 7, a method of using a modular pet litter box system includes providing a modular pet litter box system in the shipping configuration 701. The high shield is removed and each of the at least two disposable sifting trays are separated 702. Each of the at least two disposable sifting trays are oriented and nested such that the upwardly extending ribs of a first sifting tray block the sifting openings of a sifting tray nested immediately above the first sifting tray 703. The oriented and nested sifting trays, in a use configuration, are placed within the base tray 704. A top most disposable sifting tray is filled with a granular material 705. The high shield is placed atop the top most disposable sifting tray 706. A pet is permitted to place waste in the top most disposable sifting tray 707. The granular material is sifted to an adjacent disposable sifting tray while retaining the pet waste in the top most disposable sifting tray 708. The top most disposable sifting tray is disposed of along with the pet waste retained therein 709. In embodiments, a user may desire to reuse the top most disposable sifting tray and return it to the stack of nested sifting trays for additional use 710.

A pet litter box system offers a modular design and is customizable for a user to purchase the necessary amount of trays per their unique demands for maintaining the litter box. The system is utilized for maintaining the litter box by separating soiled waste from the non-soiled (clean) litter by lifting a topmost sifting tray so that clean litter passes downwardly through openings and enters onto (into) the next, now topmost layer. The removed upper-most tray containing soiled waste then may be placed into a bag, for example a biodegradable bag, for an eco-friendly disposal. In embodiments, a user may clean trays such a brushing them clean and return the brush cleaned trays to the system in lieu of disposing of trays after use.

In one embodiment, the system is designed to be a subscription, where a user orders the product online and it is shipped and delivered to the user's choice of location. Shipping directly to a user advantageously eliminates hauling heavy litter home from the store. Litter may be preloaded in the kit, advantageously eliminating the strain and hassle of lifting a heavy bag of litter and pouring it into the tray. In one embodiment, the litter ingredients may be 100% biodegradable. In an embodiment, the litter may be a hybrid blend of the most popular sodium bentonite (clumping) clay blended with a clumping plant based or wood based granule, or bentonite clay or fillers earth or diatomaceous earth, or a blend of any of the aforementioned or any other type of litter. In embodiments, the litter material may be customized for the user's and pet's preferences.

Components of the litter tray system, such as a high shield, base tray, and one or more sifting trays, may be formed from recycled cardboard, paper pulp, bagasse, bamboo, wheat straw, or any other biodegradable or plant based pulp material. In embodiments, components are shaped by applying slurry or pulp around a form and then drying. In embodiments, forms may define any openings in individual components of the system. In embodiments, the slurry or pulp dries into unitary components and desired openings are then cut into the component. In embodiments, components of the system are pressed or molded. Methods of molding pulp material into forms is known, see for example U.S. Pat. Nos. 3,046,187, 3,325,349, 3,243,096, 4,88,517, 5,656,135, and 1,551,257. All of which are incorporated herein for all purposes.

In embodiments, components of the system may be polymers or metallic. It is within the scope of this disclosure to have any combination of components formed of different materials. For example, a litter tray system could include a metallic base tray, one or more pulp based sifting trays, and a polymer high shield. In another example, a litter tray system could include a first polymer base tray, a pulp based base tray, one or more pulp based sifting trays, and a pulp based high shield. Additional structural ribs may be incorporated into the components for support in embodiments. Further, embodiments may include additional cooperating detents and indents, for example on walls or lips, to further prevent slippage or movement of components in either shipping or use configurations. It will be appreciated that some pulp materials have an amount of plasticity such that they may be flexible or otherwise deformable. According, some portions of the trays of a litter box system may readily conform to one another. For example, the circumferential lip of a top most sifting tray might readily conform the circumferential lip an adjacent sifting tray immediately below. As noted above, ribs and the like can add rigidity to pulp structures. In addition, buildup of pulp in key areas, such as along curved portions, may increase rigidity. Pulp structures may also become more rigid as they are stacked. For example, the sidewalls of two more stacked trays may be more rigid than the sidewall of an individual tray.

Although specific examples have been illustrated and described herein, it will be appreciated by those of ordinary skill in the art that any arrangement calculated to achieve the same purpose could be substituted for the specific examples shown. This application is intended to cover adaptations or variations of the present subject matter. Therefore, it is intended that the invention be defined by the attached claims and their legal equivalents, as well as the following illustrative aspects. The above described aspects embodiments of the invention are merely descriptive of its principles and are not to be considered limiting. Further modifications of the invention herein disclosed will occur to those skilled in the respective arts and all such modifications are deemed to be within the scope of the invention.

What is claimed:

1. A modular pet litter box system comprising at least two pulp formed sifting trays, each pulp formed sifting tray comprising an apertured bottom wall with at least two rows of alternating elongate sifting openings and upwardly extending ribs, each sifting opening positioned at a lowermost level of the apertured bottom wall and each sifting opening defined by a flat horizontal wall portion with parallel wall portion edges that extend substantially the length of each sifting opening, each rib having a flat horizontal plateau portion and, each of said horizontal plateau portion of each rib at an upper level of the apertured bottom wall.

2. The modular pet litter box system of claim 1, wherein each rib has a tilted wall extending from a wall portion at the lowermost level to the plateau portion such that the ribs of stacked sifting trays are nestable.

3. The modular pet litter box system of claim 1, further comprising a high shield portion that is conformingly sized to seat on lip portions of the sifting trays, the high shield portion having a skirt portion extending in a loop entirely around the high shield portion.

4. The modular pet litter box system of claim 1, where in the high shield is formed of pulp.

5. The modular pet litter box system of claim 4, wherein the high shield comprises an enlarged edge portion and a high shield wall portion such that in a use configuration the enlarged edge portion surrounds at least an upper lip of a pulp formed sifting tray and an upper lip of a base tray, and the wall portion extends upwardly away from the base tray.

6. The modular pet litter box system of claim 4, wherein the pulp formed base tray and each of the pulp formed sifting trays comprise a lip around the periphery such that each lip is configured to nest within the lip of an adjacent tray above.

7. The modular pet litter box system of claim 4, wherein the high shield comprises a front wall opposite a back wall, and a left wall opposite a right wall, wherein each wall comprises a top edge opposite a bottom edge, and the front wall being shorter than the back wall, as measured from the bottom edge to the top edge.

8. The modular pet litter box system of claim 7, wherein the top edge of each wall of the high shield defines a first opening, and the bottom edge of each wall defines a second opening, the second opening having a horizontal area greater than a horizontal area of the first opening.

9. The modular pet litter box system of claim 8, wherein the second opening of the high shield is wider, as measured from the left wall to the right wall, and longer, as measured from the front wall to the back wall, than the first opening.

10. The modular pet litter box system of claim 1, wherein in a shipping configuration the modular pet litter box system is about 12-22 inches wide, 16-25 inches long, and 4-8 inches tall.

11. A sifting tray formed from pulp material, the tray comprising an apertured bottom wall and four sidewall portions comprising two opposing end sidewall portions and two opposing lateral sidewall portions, each of the four sidewall portions extending upwardly from a periphery of the apertured bottom wall, the apertured bottom wall and the four sidewall portions all unitary with each other;

wherein the apertured bottom wall having a planar lowermost wall portion extending between each of the four sidewall portions at a lowermost level;

wherein the apertured bottom wall having a plurality of elongate openings, each elongate opening positioned in the planar lowermost wall portion within a planar portion of the bottom wall whereby an edge portion defining each opening extends outwardly in a plane that also contains the opening.

12. The sifting tray of claim 11, wherein the planar lower most wall portion does not extend directly between the opposing lateral sidewalls in a direct line and does not extend directly between the opposing end sidewalls in a direct line.

13. The sifting tray of claim 12, wherein the apertured bottom wall has a plurality of ribs projecting upwardly from the lowermost wall portion of the apertured bottom wall, each rib having a flattened top, and wherein the flattened tops define an uppermost wall portion of the bottom wall.

14. The sifting tray of claim 13, wherein each of the plurality of ribs extends from one of the two opposing lateral sidewall portions and not from the other of the two opposing lateral sidewalls.

15. The sifting tray of claim 12, wherein, except for at the sifting openings, the apertured bottom wall does not have a corner with a radius of curvature of less than 0.080 inches.

16. The sifting tray of claim 12, wherein the pulp is formed of at least one of recycled cardboard, grasses, bagasse, or bamboo.

17. A pulp sifting tray for sifting pet litter, the tray having a length of between 18 and 25 inches, a width of between 12 and 22 inches, and a height of between 2.5 and 8 inches, the tray having an apertured bottom wall and four upright sidewall portions extending upwardly and outwardly from the apertured bottom wall, the four sidewall portions comprising two opposing sidewall portions, wherein a plurality of ribs extend from a first of one of the two opposing sidewall portions along the bottom wall projecting into an interior of the sifting tray, each of the plurality of ribs not extending to the second of the two opposing sidewall portions, and wherein a plurality of ribs extend from the second of the two opposing sidewall portions along the bottom wall projecting into the interior of the tray, each of the plurality of ribs extending from the second of the two opposing sidewall portions not extending to the first of the two opposing sidewall portions.

18. The pulp sifting tray of claim 17, wherein each of the ribs extending from the first of the two opposing sidewall portions is not in alignment with a rib extending from the second of the two opposing sidewall portions.

19. The pulp sifting tray of claim 18, wherein each rib extends upwardly from a lowermost level of the bottom wall a distance of at least 0.17 inches and each rib has a flattened top surface.

20. The pulp sifting tray of claim 17 wherein an elongate sifting opening is positioned between each adjacent pair of the plurality of ribs extending from the first of the two opposing sidewall portions and an elongate sifting opening is positioned between each adjacent pair of the plurality of ribs extending from the second of the two opposing sidewall portions.

* * * * *